United States Patent
Eckardt et al.

(10) Patent No.: US 9,139,092 B2
(45) Date of Patent: Sep. 22, 2015

(54) INSTRUMENT CLUSTER AND DASH INTEGRATION

(75) Inventors: Werner Eckardt, Oakland Township, MI (US); Arthur S. Brown, Sterling Heights, MI (US); Jeremy Rooney, Waterford, MI (US); Robert Drury, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 465 days.

(21) Appl. No.: 13/191,723

(22) Filed: Jul. 27, 2011

(65) Prior Publication Data

US 2013/0027781 A1 Jan. 31, 2013

(51) Int. Cl.
| G02B 27/14 | (2006.01) |
| B60K 37/02 | (2006.01) |
| B60K 35/00 | (2006.01) |
| G02B 27/01 | (2006.01) |

(52) U.S. Cl.
CPC ............ *B60K 37/02* (2013.01); *B60K 35/00* (2013.01); *G02B 27/01* (2013.01); *B60K 2350/1064* (2013.01); *B60K 2350/1072* (2013.01); *B60K 2350/2052* (2013.01); *B60K 2350/941* (2013.01); *B60K 2350/946* (2013.01); *B60K 2350/948* (2013.01); *B60K 2350/965* (2013.01)

(58) Field of Classification Search
CPC ........... G02B 27/01; G02B 2027/0165; G02B 2027/0123; B60K 35/00; B60K 2350/2052; B60K 2350/1072; B60K 2350/1064; B60K 2350/2026; B60K 2350/941; B60K 37/02; B60R 2300/205
USPC ................. 359/13, 629–632; 340/461; 345/7; 362/489
See application file for complete search history.

(56) References Cited

U.S. PATENT DOCUMENTS

| 5,204,666 | A | 4/1993 | Aoki et al. |
| 5,997,161 | A * | 12/1999 | Stringfellow et al. ........ 362/489 |
| 6,404,333 | B1 * | 6/2002 | Ayres et al. .................... 340/461 |
| 8,077,396 | B2 * | 12/2011 | Croy et al. ..................... 359/632 |
| 2006/0132924 | A1 * | 6/2006 | Mimran ........................ 359/630 |
| 2009/0090756 | A1 | 4/2009 | Day et al. |
| 2010/0131190 | A1 * | 5/2010 | Terauchi et al. .............. 701/201 |
| 2010/0156782 | A1 * | 6/2010 | Kosinski et al. .............. 345/156 |

FOREIGN PATENT DOCUMENTS

EP 0643315 A1 3/1995

OTHER PUBLICATIONS

International Search Report & Written Opinion for PCT Application No. PCT/US2012/048447 mailed Feb. 6, 2013.
Invitation to Pay Additional Fees for PCT Application No. PCT/US2012/048447 mailed Nov. 28, 2012.
International Preliminary Report on Patentability for International Application No. PCT/US2012/048447 mailed on Feb. 6, 2014.

* cited by examiner

*Primary Examiner* — Mahidere Sahle (57) ABSTRACT

An instrument cluster assembly mounts within a vehicle dashboard. An opening is defined within the dashboard provides for mounting of an instrument cluster assembly. The example instrument cluster assembly includes a top surface that corresponds with the top surface of the dashboard to provide a completed top visible surface when in a completed assembled condition. The instrument cluster assembly includes a first gauge and a second gauge separated by an open space therebetween. A bi-vision display is mounted in the open space between the first and second gauges. The bi-vision display generates a virtual image that is viewed by the operator between the first and second gauges.

15 Claims, 7 Drawing Sheets

INSTRUMENT CLUSTER AND DASH INTEGRATION

BACKGROUND

This disclosure generally relates to an instrument cluster for a motor vehicle. More particularly, this disclosure relates to an instrument cluster for a motor vehicle that includes portions of a vehicle dashboard and alternate displays improving readability of the instruments and gauges.

A vehicle instrument cluster is typically installed within a cavity provided within a vehicle dashboard. The dashboard provides the visible upper surfaces and defines the space into which the instrument cluster is mounted. Assembly and manufacturing tolerances add to the size of the opening and thereby reduce the amount of space available for both the instrument cluster and the dashboard. Moreover, assembly of the instrument cluster into the opening is essentially blind as access to the back of the instrument cluster is restricted.

Additionally, it is desirable to reduce focal distance changes that must be performed by the driver during operation. A driver must refocus from the road to the instrument cluster periodically to obtain information regarding vehicle operation. The time taken for refocusing from the road to the instrument cluster and back to the road can be reduced by devices such as heads up displays and other similar devices. However, such devices require additional hardware and physical structures that are installed separate from the instrument cluster, further complicating manufacture and assembly.

Accordingly, it is desirable to provide an instrument cluster than can simplify assembly, reduce costs and improve communication of vehicle operating information to a vehicle operator.

SUMMARY

A disclosed instrument cluster assembly mounts within a vehicle dashboard and includes a single housing supporting traditional gauges and an alternate display vehicle forward of the gauges. The dashboard includes a top surface that provides a finished visible surface and includes a space onto which the disclosed instrument housing is mounted. The instrument cluster assembly includes a top surface that corresponds with the top surface of the dashboard to provide a completed top visible surface when in a completed assembled condition. The instrument cluster assembly includes first and second traditional gauges and an alternate display mounted vehicle forward of the gauges. The alternate display can include a bi-vision display is mounted between the first and second gauges that generates a virtual image that is viewed by the operator between the first and second gauges. Another disclosed alternate display includes a heads up display mounted within the same housing supporting the gauges. The heads up display can include a panel for displaying a projected image or can project the image onto another vehicle structure, such as the vehicle windshield, for viewing by the vehicle operator.

The gauges and the alternate display are supported within a common housing to reduce weight, assembly time and further ease installation. Moreover, because the instrument panel assembly provides a top visible surface once in an assembled condition, space previously required to compensate for assembly tolerances can be productively utilized.

These and other features disclosed herein can be best understood from the following specification and drawings, the following of which is a brief description.

DETAILED DESCRIPTION

Figure 1A:
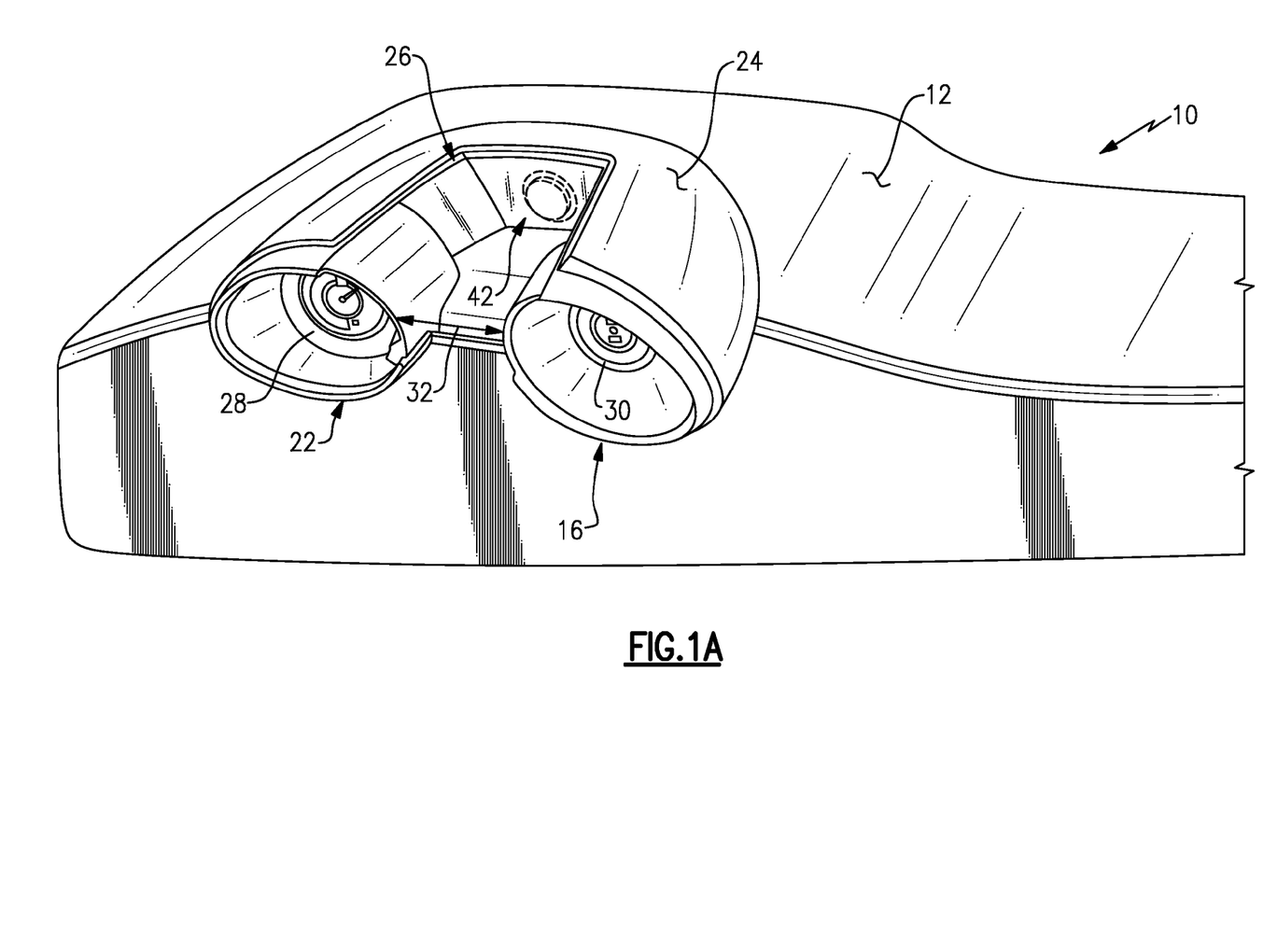
FIG. 1A is a schematic view of an example vehicle dashboard including an example instrument cluster assembly.
Figure 1B:
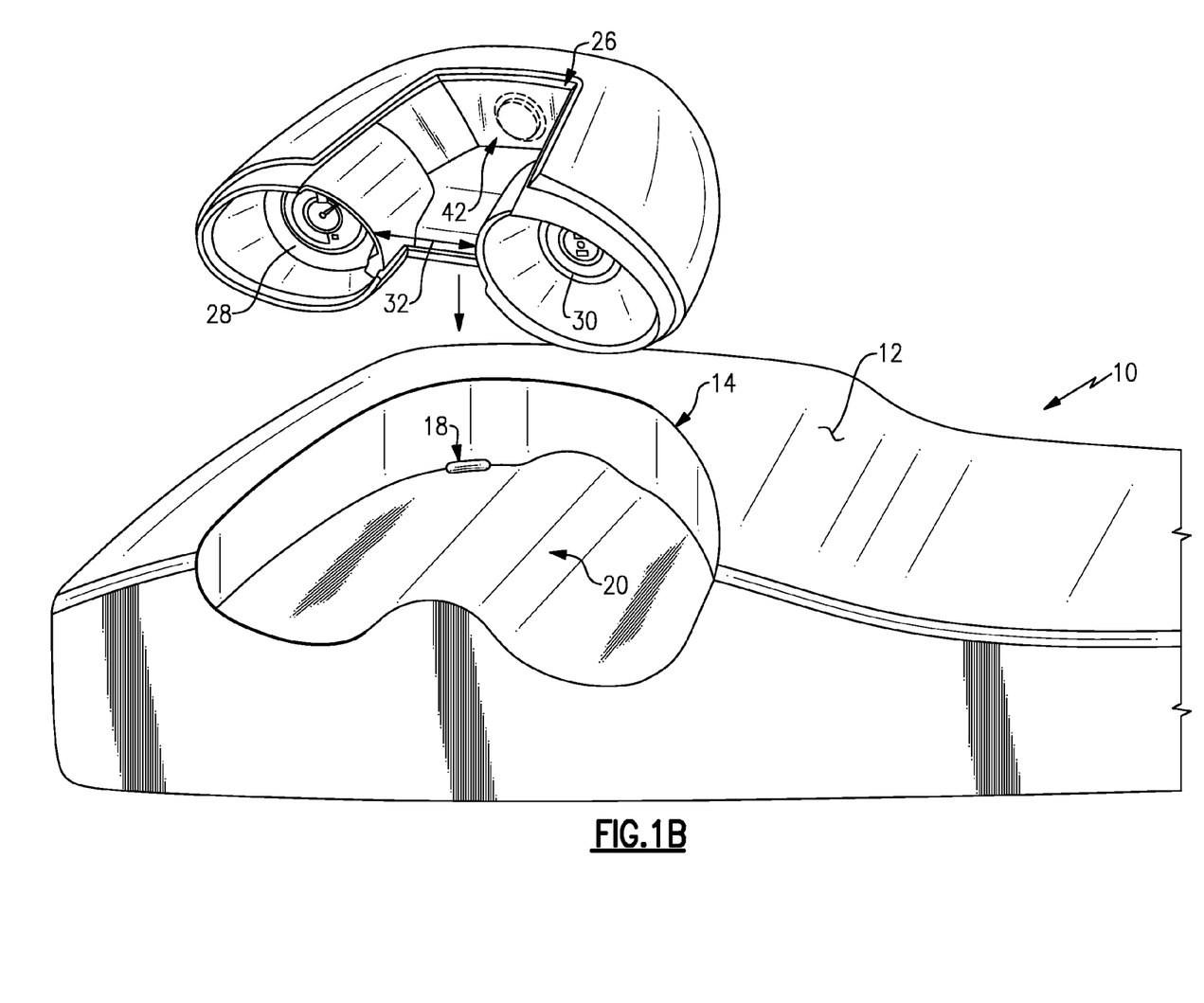
FIG. 1B is a schematic view of an opening in the example vehicle dashboard for the example instrument cluster assembly.

Referring to FIGS. 1A and 1B, a vehicle dashboard is generally indicated at 10 and includes a top surface 12 that provides a finished visible surface. An opening 14 is defined within the top surface 12 that opens to a cavity 20 provided for mounting of an instrument cluster assembly 16. The example instrument cluster assembly 16 includes a top surface 24 that corresponds with the top surface 12 of the dashboard 10 to provide a completed top visible surface when in a completed assembled condition. An electrical connection 18 is provided within the cavity 20 that corresponds with a mating electrical connection on the instrument cluster assembly 16 to provide power and communicate with various vehicle systems.

Figure 2:
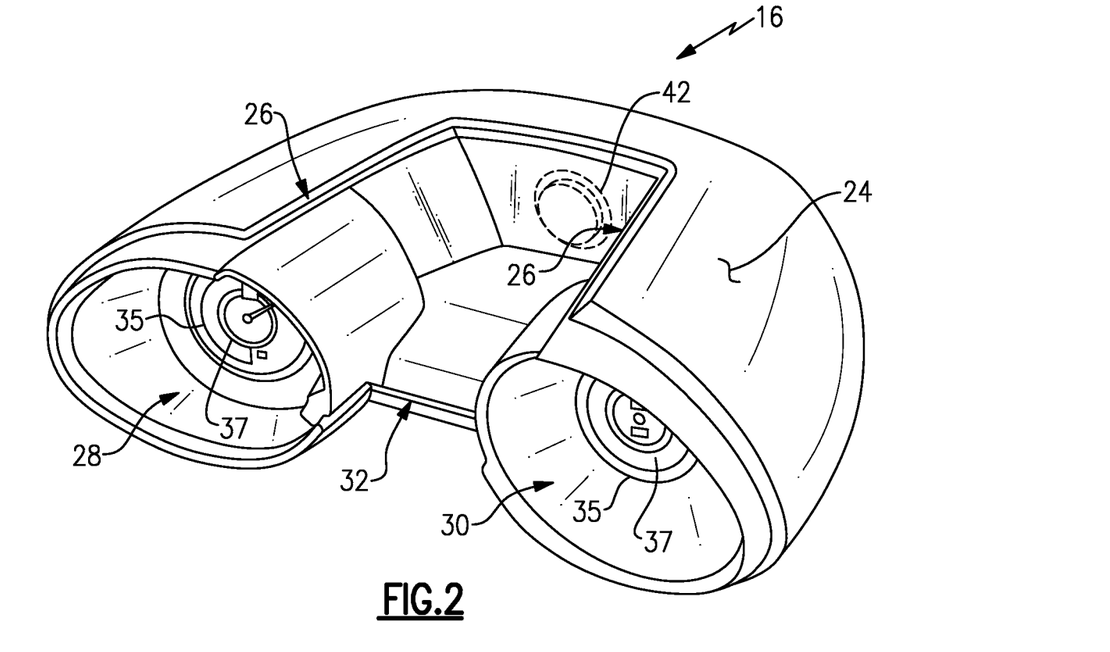
FIG. 2 is a perspective view of the example instrument cluster assembly.

Referring to FIG. 2, the disclosed instrument cluster assembly 16 includes a first gauge 28 and a second gauge 30 separated by an open space 32 therebetween. The example first and second gauges 28, 30 are round and include respective faces 35 with associated scales 37 indicative of vehicle operating conditions. In this example the first gauge 28 is a tachometer that provides information indicative of engine speed. The second gauge 30 includes a scale 37 for providing a visual presentation of a current condition of an engine operating parameter such as coolant temperature, oil pressure, or any other operating parameter desired for communicating vehicle operating conditions. It is within the contemplation of this invention that the first and second gauges 28 and 30, may be analog gauges with a movable pointer, or may be digital gauges that generate a displayed visual representation of the specific measured parameter.

Between the first and second gauges 28, 30 are the opening 26 in the top surface 24 of the instrument cluster housing 22. The housing 22 includes the top surface 24 that provides a visible finished top surface with the opening 26 into the open space 32. The opening 26 exposes the open space 32 between the first and second gauges 28, 30 in which a third information display 42 is located. In this example the third information display 42 is set back from the first and second gauges 28, 30 such that the third information display 42 is spaced further away from the vehicle operator.

The first and second gauges 28, 30 are disposed within a first common plane 50 (FIG. 5) and the third information display 42 is set back from the first plane 50 a distance. The distance is defined as the distance from an example operator such that the gauges 28, 30 in the first plane 50 are closer to the driver, and the third display 42 is disposed, both physically and virtually a further distance than the first plane 50 than the first and second gauges 28,30.

As appreciated, a vehicle operator must change focal points from the road to the gauges 28, 30 of the instrument cluster 16 from time to time during vehicle operation. It is desirable to reduce the differences in focal lengths between the road and the instrument cluster assembly 16 to improve driver comfort and the ability to react to elements within the vehicles path.

The example third display 42 is provided set back from the first and second gauges 28, 30 to reduce the difference in focal length between information provided by the third display 42 and the road. Moreover, the third display 42 is set within the open space 32 such that improved viewing either through or over a steering wheel 54 (FIG. 5) is provided.

The example third display 42 is a virtual display meaning that the image actually viewed by an operator is reflected from a surface that receives the image from a display device located out of the operator's line of sight.

Figure 3:
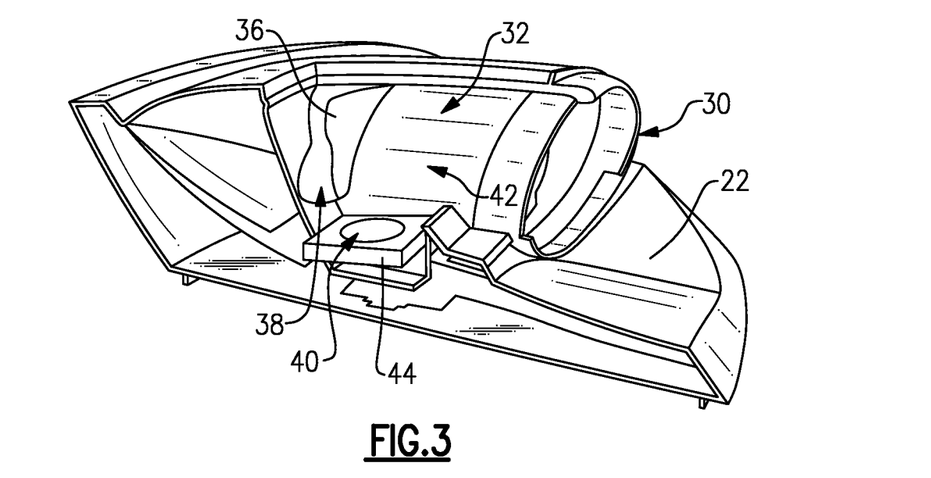
FIG. 3 is a sectional view of the example instrument cluster assembly.
Figure 4:
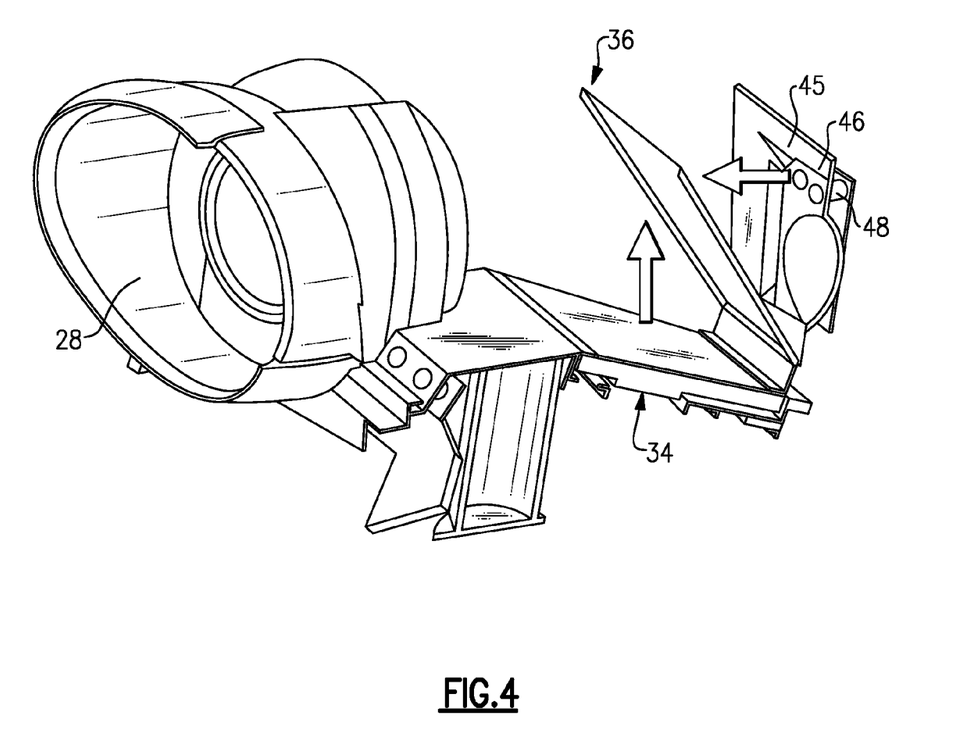
FIG. 4 is a schematic view of a virtual display of the example instrument cluster assembly.

Referring to FIGS. 3 and 4, the example third information display 42 is supported within the same housing 22 as the first and second gauges 28, 30 and includes an electronic display 34 supported on a circuit board 44. As the example instrument cluster assembly 16 is supported within a common housing 22, a single circuit board 44 can be utilized to support the function of all of the gauges 28, 30. Moreover, the inclusion of both conventional gauges and the virtual displays in a common housing 22 reduces assembly and manufacture requirements while efficiently utilizing space within the vehicle dashboard.

The example third display 42 includes the electronic display 34 that emits an actual image 40 that is viewable as a virtual image 38 on a reflective and transmissive surface 36. The example display 34 provides an indication of vehicle speed; however, the example display 34 can be configured to provide any information desired by the driver. The use of the electronic display 34 provides for the display of different and selectable information as well as providing for the selection of how that information is presented. Information may be presented in digital form, as a graph, or as a digital representation of a conventional dial gauge.

The example virtual display 42 further includes a back portion 46 that supports illuminatable devices such as light emitting diodes 48 (LED) that can be provided to illuminate one or more tell tale 45 images through the transmissive surface. The term "tell tale" is used to describe images such as turn signals and check engine lights that are substantially only visible when illuminated. The back portion 46 may house many different LEDs 48 that correspond with tell tale images that can be graphically represented on the transmissive surface 36. Moreover, the graphical representation may be provided on the back surface 46 such that the transmissive surface need not include the different tell tale symbols.

The display 42 generates a virtual image 38 that is viewed by the operator between the first and second gauges 28, 30. The opening 26 in the top surface 24 provides for more viewing options to the driver as the placement of the virtual image 38 produced by the display 42 can be adjusted to provide a desired viewing angle for the driver.

Figure 5:
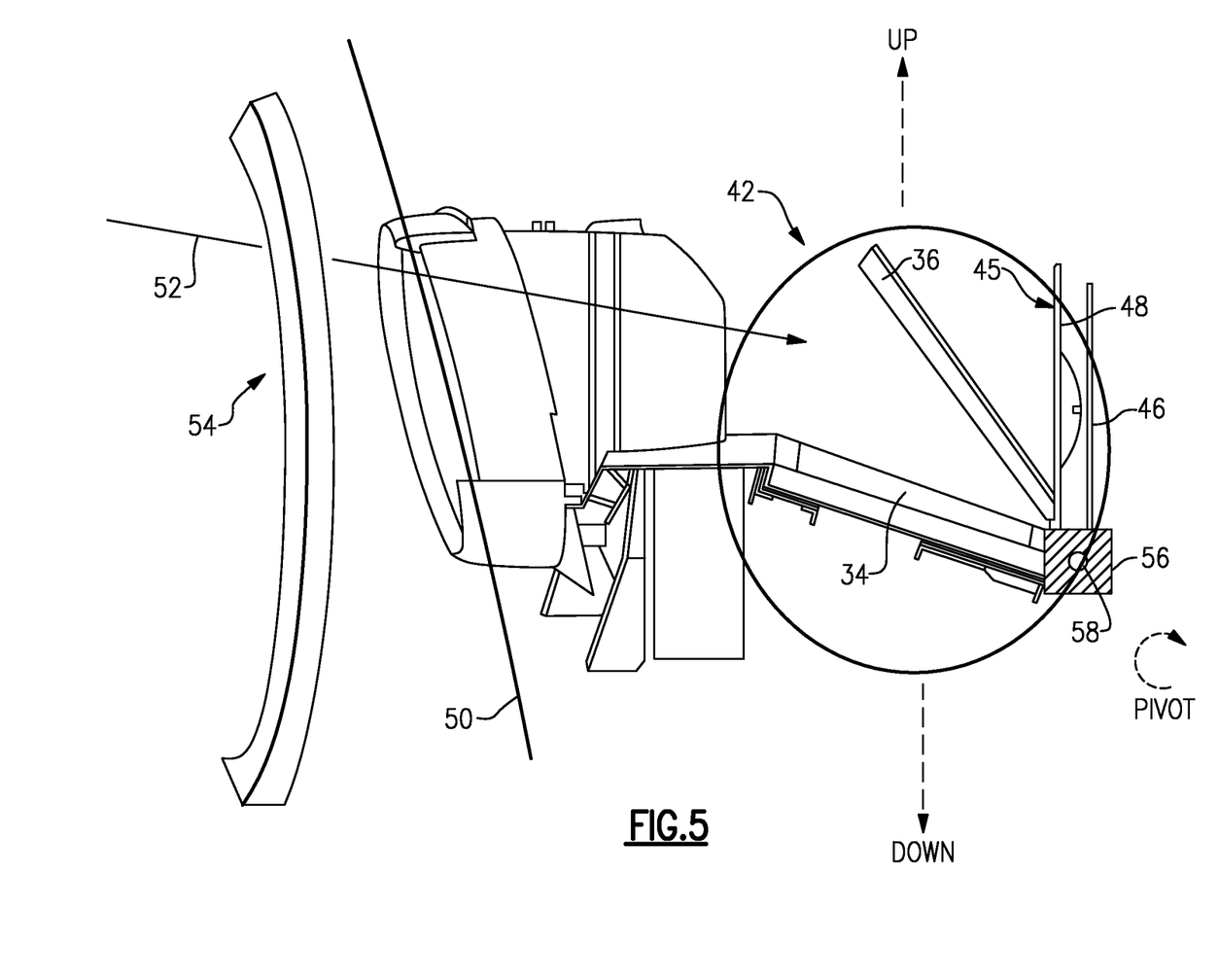
FIG. 5 is a schematic view of an example bi-vision display unit of the example instrument cluster assembly.

Referring to FIG. 5, the bi-vision display 42 unit is pivotally mounted within the housing 22 such that it may be adjusted to tailor the line of vision 52 to the specific operator. In this example an electric motor 56 is provided at a pivot 58 such that the bi-vision display 42 can be adjusted to provide a desired line of vision 52. However, it is within the contemplation of this invention to utilize other actuating devices such as linear actuators or a manually operated mechanism to adjust the placement of the bi-vision display to provide the desired line of vision.

The example bi-vision display 42 is disposed within the space 32 below the opening 26 in the top surface 24 of the instrument housing 22 and therefore may be utilized to provide a heads up display feature. A heads up display (HUD) provides for the projection of an image to a location that provides an operator with view of both the image and the road at substantially the same focal length. Typical HUD devices require devices mounted remotely from the instrument cluster to provide the location of the image. The example instrument cluster assembly 16 can includes a HUD display that can be mounted as a single unit with the instrument cluster assembly 16.

Figure 6:
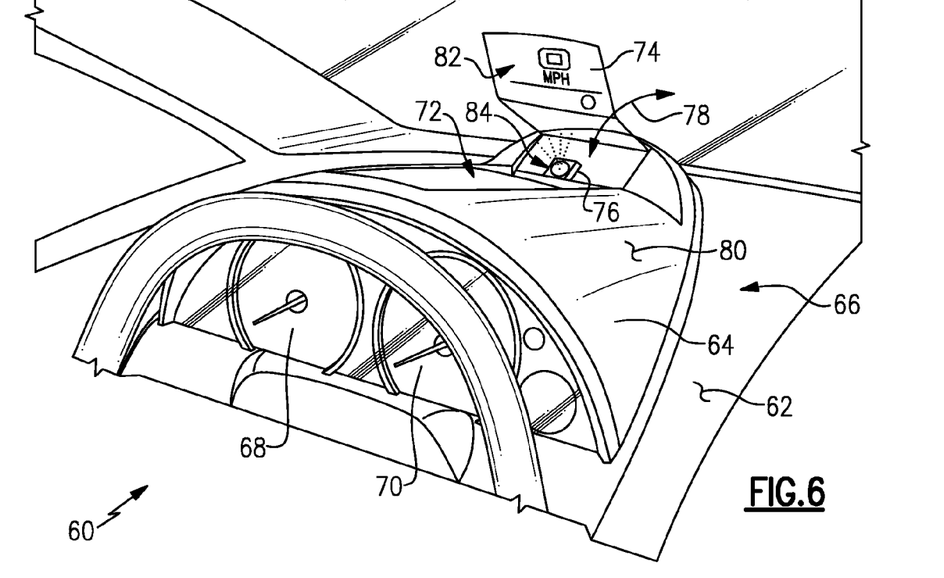
FIG. 6 is a perspective view of an example instrument cluster assembly including a heads up display.
Figure 7:
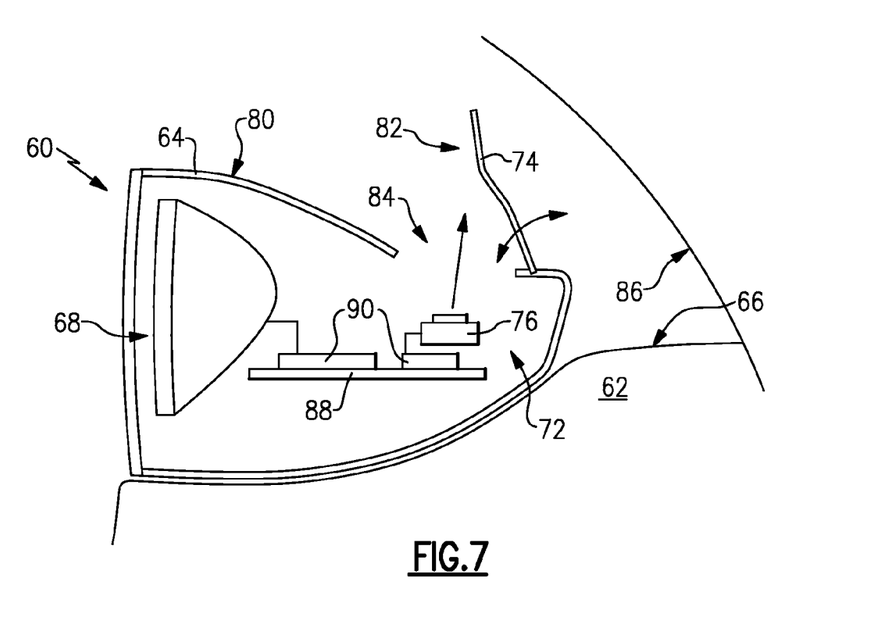
FIG. 7 is a schematic cross-section of the instrument cluster shown in FIG. 6.

Referring to FIGS. 6 and 7, an example instrument panel assembly 60 includes a housing 64 that mounts atop a top surface of a dashboard 62. The dashboard 62 includes a top visible surface 66 and the instrument panel assembly 60 includes a corresponding visible surface 80. The instrument panel assembly 60 includes a common housing 64 that supports first and second gauges 68, 70 along with a heads up display assembly 72. Because both the gauges and the heads up display assembly 72 are supported within a common housing 64, assembly is simplified and structure that would otherwise be separated can be combined. For example, a circuit board 88 can include controllers 90 for controlling both the gauges 68, 70 and the heads up display assembly 72.

In the illustrated example, the heads up display assembly 72 includes a panel 74 that is movable between a viewing position shown and a closed position that does not provide for viewing. A projector 76 is supported within the housing and emits an image through opening 84 that is reflected as viewable image 82 on the panel 74. The entire structure required for the heads up display 72 is supported within the single housing 64 such that both the traditional gauges 68, 70 and the heads up display 72 can be installed at the same time.

Figure 8:
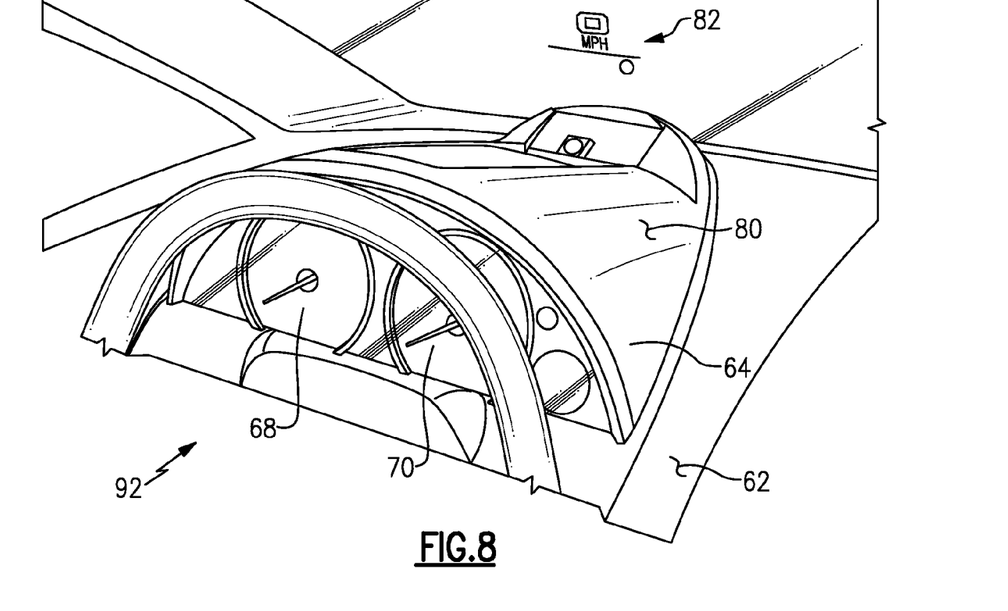
FIG. 8 is a perspective view of another example instrument cluster assembly including a heads up display.
Figure 9:
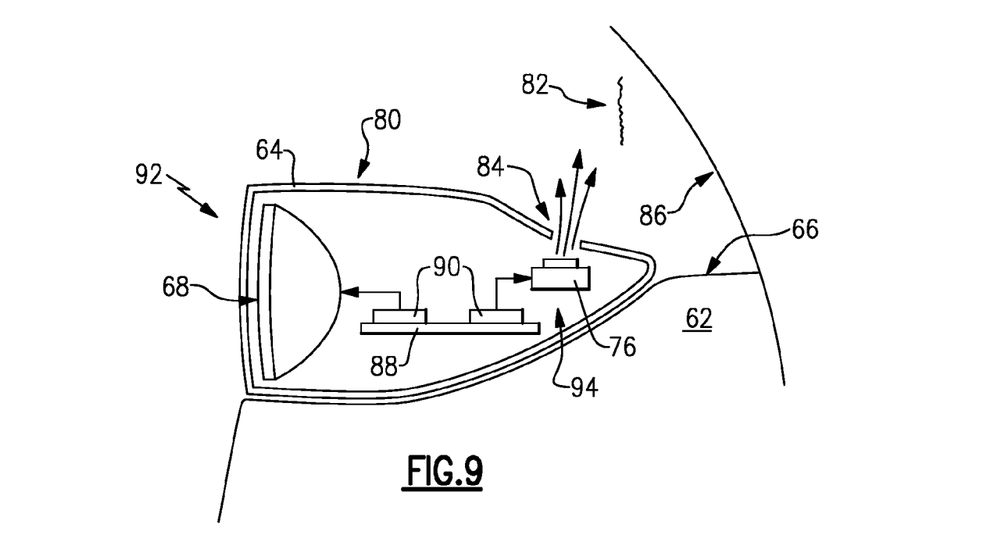
FIG. 9 is a schematic cross-section of the instrument cluster shown in FIG. 8.

Referring to FIGS. 8 and 9, another example instrument cluster assembly 92 includes a heads up display assembly 94 that includes a projector 76 that emits an image that is reflected on another vehicle structure, such as a windshield 86 in this example. The reflected image 82 provides an image that appears to be disposed a significant vehicle forward distance from the gauges 68, 70. The vehicle forward appearance of the image 82 is desirable to limit the refocusing required by the operator, such that the operator may maintain eye contact with the road without looking back within the vehicle to the significantly closer gauges 68, 70.

Accordingly, the disclosed instrument panel assemblies improve installation efficiencies by mounting all gauge structures within a common housing. Moreover, the housing is mounted on top of the dashboard, instead of within an opening defined within the dashboard. The on top mounting of the instrument panel assembly provides not only assembly improvements but also reduces wasted space required to compensate for assembly tolerances. Further, the example instrument panels assemblies include a visible surface that corresponds with the visible surface of the dashboard to further improve assembly efficiencies.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. An instrument cluster assembly for a vehicle including a dashboard, the instrument cluster comprising: at least two gauges providing information relating to vehicle operation, wherein the at least two gauges are spaced apart to define an open space therebetween: a housing configured for mounting onto a top surface of a dashboard, whereby the housing defines a top visible surface of the dashboard in an installed condition and supports the at least two gauges and includes an opening through the top visible surface corresponding with the open space between the at least two gauges; and an electronic display for emitting an image viewable as a virtual image separated from the electronic display, wherein the electronic display is supported within the housing in the open space defined between the at least two gauges and the virtual image is viewable within the open space between the at least two gauges.

2. The instrument cluster assembly as recited in claim 1, wherein the virtual image is viewable in the open spaced defined between the at least two gauges.

3. The instrument cluster assembly as recited in claim 2, wherein the two gauges are disposed within a first plane and the virtual image is spaced vehicle forward of the first plane.

4. The instrument cluster assembly as recited in claim 3, wherein the electronic display comprises a display for generating images relating information indicative of vehicle operation and a reflective surface for viewing the displayed information to an operator.

5. The instrument cluster assembly as recited in claim 2, wherein the electronic display is movable for adjusting a viewing position.

6. The instrument cluster assembly as recited in claim 4, including illuminatable tell tales that are visible through the reflective surface in an illuminated condition.

7. An instrument cluster assembly for a vehicle including a dashboard, the instrument cluster assembly comprising: a housing mountable within the dashboard; first and second gauges for communicating information indicative of vehicle operation supported within the housing, wherein the first and second gauges are spaced a distance apart within the housing to define an open space therebetween; and a heads up display disposed vehicle forward of the first and second gauges, wherein the heads up display includes an electronic display for emitting a virtual image that is supported entirely within the housing, wherein the electronic display is supported within the open space between the spaced apart first and second gauges within the housing.

8. The instrument cluster assembly as recited in claim 7, the housing configured for mounting to a top surface of the dashboard.

9. The instrument cluster assembly as recited in claim 8, wherein the heads up display includes a viewing surface vehicle forward of the first and second gauges, the viewing surface supported within the housing.

10. The instrument cluster assembly as recited in claim 9, wherein the viewing surface comprises a panel movable between a viewing position visible to a vehicle operator and a closed position wherein the panel is disposed within the housing.

11. The instrument cluster assembly as recited in claim 7, wherein the heads up display comprises a projector for generating an image indicative of a vehicle operating parameter viewable by a vehicle operator.

12. The instrument cluster assembly as recited in claim 11, wherein the housing includes an opening vehicle forward of the first and second gauges through which the projector emits the image indicative of a vehicle operating parameter.

13. A method of installing an instrument cluster assembly to a vehicle dashboard comprising: defining an open top surface of a dashboard assembly that does not include a desired final top visible surface; defining a desired final visible surface on an instrument cluster assembly; attaching the instrument cluster assembly including at least two gauges supported within a common housing onto the open top surface of the dashboard, wherein the visible surface of the instrument cluster defines at least a portion of the desired final visible surface of the dashboard assembly; and mounting an electronic display for emitting a virtual image within the instrument cluster between the at least two gauges and vehicle forward of the at least two gauges.

14. The method as recited in claim 13, including mounting a heads up display within the instrument cluster assembly, the instrument cluster assembly including a housing extending vehicle forward of the at least two gauges with an emitter of the heads up display supported within the housing vehicle forward of the at least two gauges.

15. The method as recited in claim 14, including supporting a panel within the housing for movement between a viewing position viewable by a vehicle operator and a closed position not viewable.

* * * * *